US009151471B2

(12) United States Patent
Ogura

(10) Patent No.: US 9,151,471 B2
(45) Date of Patent: Oct. 6, 2015

(54) LIGHT SOURCE DEVICE AND PROJECTOR

(71) Applicant: CASIO COMPUTER CO., LTD., Shibuya-ku, Tokyo (JP)

(72) Inventor: Naotsugu Ogura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 194 days.

(21) Appl. No.: 13/794,752

(22) Filed: Mar. 11, 2013

(65) Prior Publication Data

US 2013/0250253 A1 Sep. 26, 2013

(30) Foreign Application Priority Data

Mar. 21, 2012 (JP) ................................. 2012-064213

(51) Int. Cl.
| G03B 21/26 | (2006.01) |
| F21V 23/02 | (2006.01) |
| F21V 13/08 | (2006.01) |
| G03B 21/20 | (2006.01) |
| G03B 33/08 | (2006.01) |

(52) U.S. Cl.
CPC .............. *F21V 13/08* (2013.01); *G03B 21/204* (2013.01); *G03B 21/2013* (2013.01); *G03B 33/08* (2013.01)

(58) Field of Classification Search
CPC .................................................... G03B 21/204
USPC ......... 353/94, 84, 31; 359/629; 362/260, 227, 362/230, 231
See application file for complete search history.

(56) References Cited

U.S. PATENT DOCUMENTS

| 8,348,432 | B2 | 1/2013 | Miyazaki | |
| 8,556,433 | B2 | 10/2013 | Yoshigai | |
| 8,783,886 | B2* | 7/2014 | Huang | 362/34 |
| 8,820,940 | B2* | 9/2014 | Kita | 353/84 |
| 2011/0109820 | A1* | 5/2011 | Silverstein et al. | 349/8 |
| 2011/0292349 | A1* | 12/2011 | Kitano et al. | 353/31 |

FOREIGN PATENT DOCUMENTS

| JP | 2011-13320 A | 1/2011 |
| JP | 2011100163 A | 5/2011 |
| JP | 2011128482 A | 6/2011 |

(Continued)

OTHER PUBLICATIONS

Korean Office Action dated Jun. 24, 2014 issued in counterpart Korean Application No. 10-2013-0029318.

(Continued)

*Primary Examiner* — William C Dowling
*Assistant Examiner* — Ryan Howard
(74) *Attorney, Agent, or Firm* — Holtz, Holtz, Goodman & Chick PC

(57) ABSTRACT

A light source device includes a first light source, a fluorescent material, a second light source, and a synthesis member. The synthesis member includes a visible light reflecting film, and a transmitting window which is disposed in the visible light reflecting film to transmit the visible light. The second light source, the fluorescent material and the synthesis member are mutually arranged in such positional relations that the transmitting window is positioned along optical axis of light emitted from the second light source and that generated light emitted from the fluorescent material is reflected in an optical axis direction of the light emitted from the second light source by the visible light reflecting film.

7 Claims, 4 Drawing Sheets

(56) References Cited

FOREIGN PATENT DOCUMENTS

| JP | 2011170363 A | 9/2011 |
|---|---|---|
| JP | 2012002871 A | 1/2012 |

OTHER PUBLICATIONS

Chinese Office Action dated Oct. 30, 2014, issued in counterpart Chinese Application No. 201310123437.X.

\* cited by examiner

LIGHT SOURCE DEVICE AND PROJECTOR

CROSS-REFERENCE TO RELATED APPLICATIONS

This application is based upon and claims the benefit of priority under 35 USC 119 of Japanese Patent Application No, 2012-064213 filed on Mar. 21, 2012, the entire disclosure of which, including the description, claims, drawings, and abstract, is incorporated herein by reference in its entirety.

BACKGROUND OF THE INVENTION

1. Field of the Invention

The present invention relates to a light source device and a projector provided with the light source device.

2. Description of the Related Art

Nowadays, data projectors are often used as image projecting devices for projecting images, such as displays of personal computers, video images and, images of image data stored in memory cards, on screens. Each of these projectors gathers light projected from light sources on a micromirror display device called a digital micromirror device (DMD®) or a liquid crystal display panel, to display color images on a screen.

Heretofore, in this type of projector, a discharge lamp having a high luminance has been mainly used as a light source, but in recent years, there have been made developments and suggestions of employing a light emitting diode, a laser diode, an organic EL or a fluorescent material as the light source. For example, in Jpn. Pat. Appln. KOKAI Publication No. 2011-13320, a light source device has been suggested which emits blue light obtained by dispersing an excitation light from a laser light source for emitting the excitation light having a blue wavelength, red light from a red color emitting diode for emitting the red light, and green light from a fluorescent material for emitting the green light by receiving the excitation light from the laser light source. In this light source device, a dichroic mirror is used which can transmit or reflect an arbitrary wavelength, to synthesize the blue light, the green light and the red light from the respective light sources on one image display device.

In the dichroic mirror disclosed in Jpn. Pat. Appln. KOKAI Publication No. 2011-13320, the light can be synthesized with a high efficiency, if each wavelength of the synthesized light is a single-wavelength or a narrowband wavelength. However, when a light having an extensive wavelength distribution is synthesized, a portion of the wavelength bandwidth is not synthesized sometimes to cause a loss.

FIG. 1 shows an example of a light emitting distribution of a yttrium.aluminum.garnett (YAG) fluorescent material which can be utilized as a light source for the green light. As shown in the drawing, on the short wavelength side of the light emitting distribution of the fluorescent material, any light emitting component is not present in a wavelength bandwidth of about 440 nm to about 460 nm which is used in a blue light source. On the other hand, on the long wavelength side, the light emitting component is present in a wavelength bandwidth of about 620 nm to about 640 nm which is used in a red light source.

In synthesizing the red light and the blue light with the light emitted by such a fluorescent material, the synthesis is possible by use of a dichroic filter having characteristics of reflecting the light of 500 to 600 nm at a 45° incidence and transmitting wavebands of the red color and the blue color, for example, as shown in FIG. 2. In a transition wavelength bandwidth having the reflecting and transmitting characteristics of the dichroic mirror which synthesizes the light having wavelengths by use of such a dichroic filter, the characteristics are usually moderately varied in a wavelength width of 30 to 40 cm, in consideration of costs and manufacturing yield. Therefore, when the emitted light from the fluorescent material shown in FIG. 1 is synthesized with the red light and the blue light by use of the dichroic filter shown in FIG. 2, a reflectance gradually deteriorates from about 580 nm, and most of the light emitting components of 620 nm or more are transmitted, with the result that the synthesis with the red light and the blue light is not accomplished. Accordingly, in this example, about 7% of the emitted light from the fluorescent material is not synthesized unnecessarily.

BRIEF SUMMARY OF THE INVENTION

The present invention has been developed in view of the above respects, and an object thereof is to provide a light source device in which an emitted light from a fluorescent material can effectively be utilized without losing most of the emitted light, and a projector provided with the light source device.

According to a first aspect of the invention, there is provided a light source device comprising: a first light source which emits excitation light of a first wavelength bandwidth; a fluorescent material which receives the excitation light from the first light source to generate light of a second wavelength bandwidth which is different from the first wavelength bandwidth; a second light source which emit lights of wavelength bandwidth which is different from the second wavelength bandwidth; and a synthesis member including a visible light reflecting film which reflects visible light, and a transmitting window which is disposed in the visible light reflecting film to transmit the visible light, wherein the second light source, the fluorescent material and the synthesis member are mutually arranged in such positional relations that the transmitting window of the synthesis member is positioned along optical axis of the light emitted from the second light source and that the generated light emitted from the fluorescent material is reflected in an optical axis direction of the light emitted from the second light source by the visible light reflecting film of the synthesis member.

According to a second aspect of the invention, there is provided a projector comprising: a light source device according to the first aspect of the invention; a display device; a light source side optical system which guides the light from the light source device to the display device; a projecting side optical system which projects an image emitted from the display device; and a projector control section which controls the light source device and the display device.

According to the present invention, most of the emitted light from the fluorescent material is reflected by the visible light reflecting film, and the emitted light from the fluorescent material in the portion of the transmitting window is only transmitted. Therefore, it is possible to provide a light source device in which the emitted light from the fluorescent material can effectively be utilized without losing most of the emitted light, and a projector provided with the light source device.

BRIEF DESCRIPTION OF THE SEVERAL VIEWS OF THE DRAWING

The present invention will more sufficiently be understood by the following detailed description and the accompanying drawings, which are, however, exclusively for explanation and do not limit the scope of the present invention.

Here.

DETAILED DESCRIPTION OF THE INVENTION

Hereinafter, embodiments for carrying out the present invention will be described with reference to the drawings.

[First Embodiment]

Figure 1:
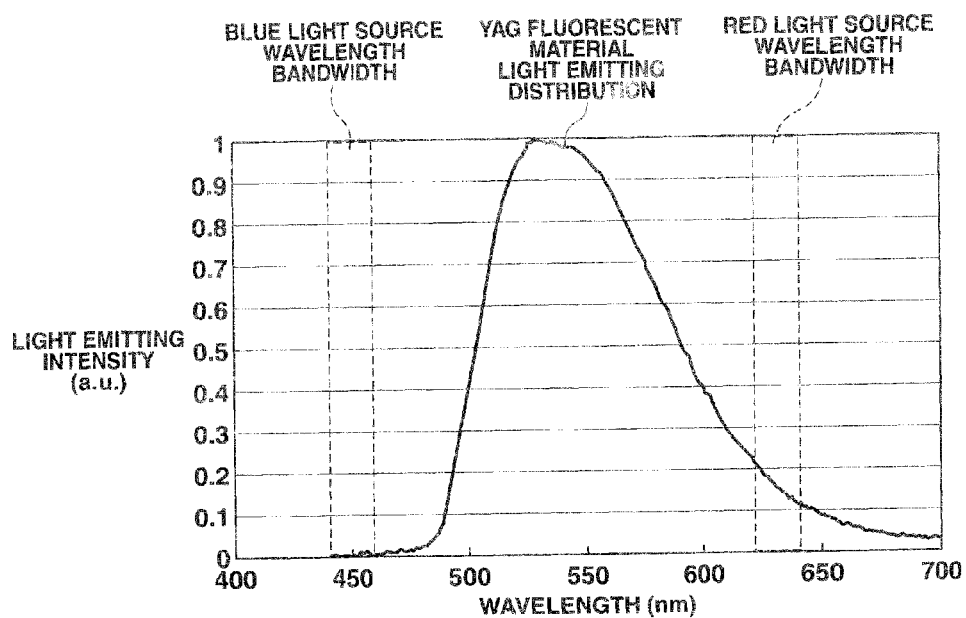
FIG. 1 is a diagram showing an example of a light emitting distribution of a YAG fluorescent material.
Figure 2:
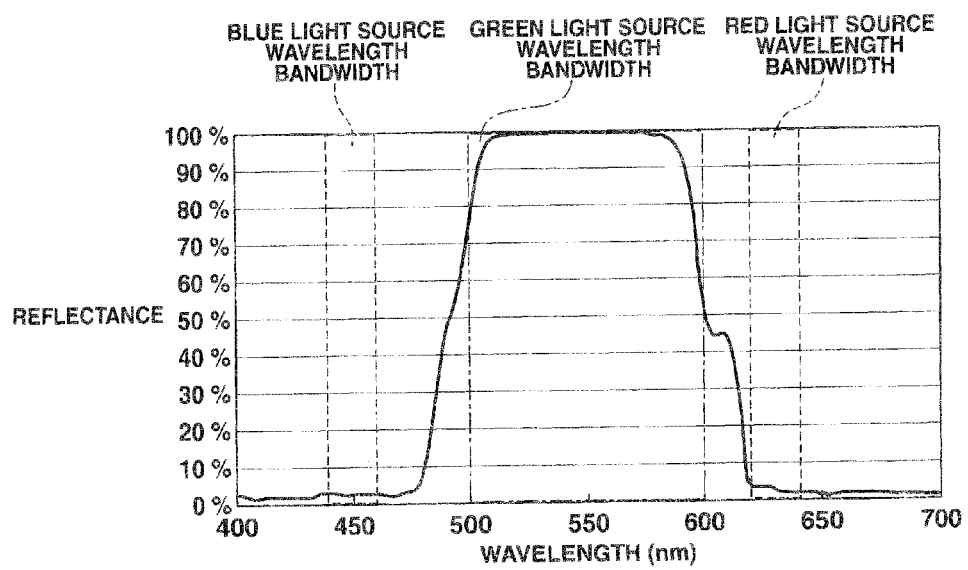
FIG. 2 is a diagram showing an example of reflecting and transmitting characteristics of a dichroic filter.
Figure 3:
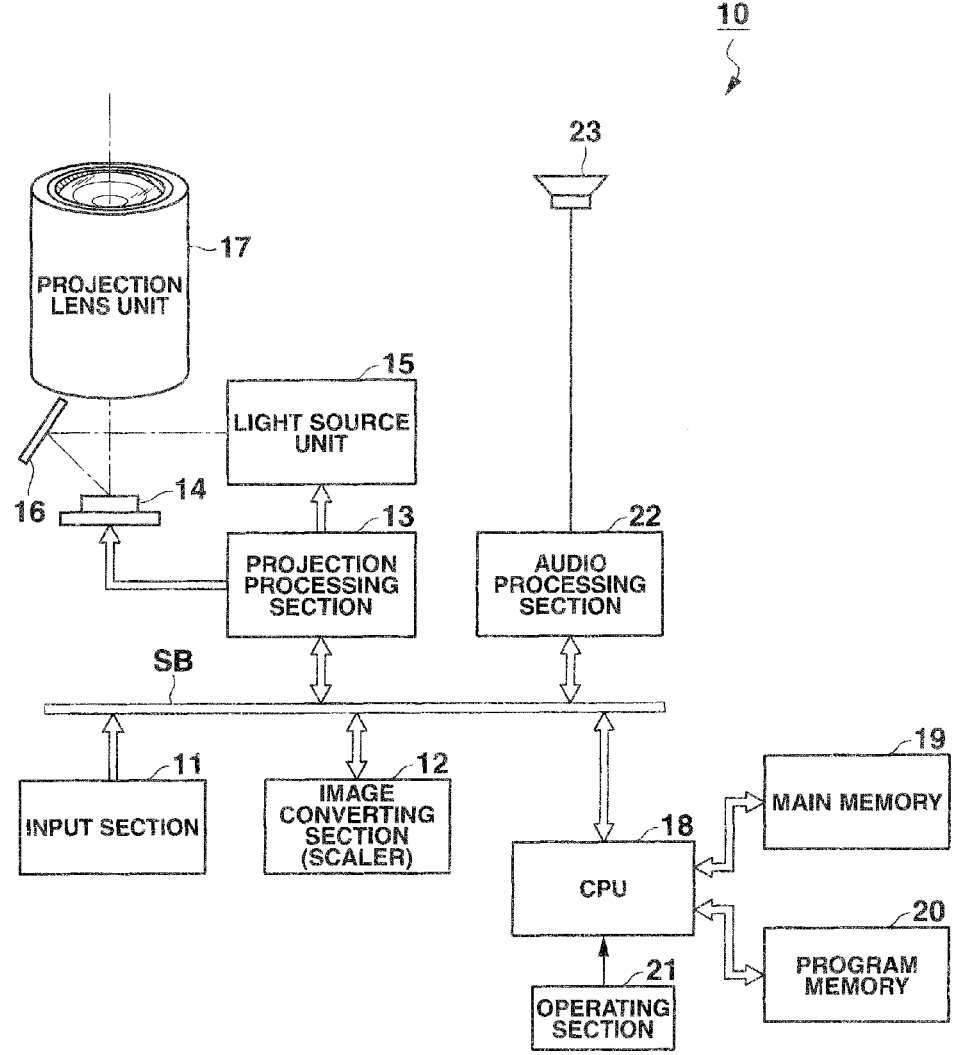
FIG. 3 is a schematic block diagram showing a constitution example of a projector according to a first embodiment of the present invention.

In a projector according to a first embodiment of the present invention, there is employed a digital light processing (DLP®) system using a micromirror display device. FIG. 3 schematically shows a constitution of a projector 10 of the present embodiment. The projector 10 includes an input section 11, an image converting section 12, a projection processing section 13 as a projector control section which controls a light source device and a display device, a micromirror device 14 as the display device, a light source unit 15 as a light source device according to the first embodiment of the present invention, a mirror 16 as a light source side optical system which guides light from the light source device onto the display device, a projection lens unit 17 as a projecting side optical system which projects an image emitted from the display device on a screen or the like, a CPU 18, a main memory 19, a program memory 20, an operating section 21, an audio processing section 22, and a speaker 23.

The input section 11 is provided with terminals such as a pin. jack (RCA) type video input terminal and/or a D-sub 15 type RGB input terminal, and through the terminal, analog image signal is input. The input section 11 converts the input analog image signal of various specifications to a digital image signal. The input section 11 outputs the converted digital image signal to the image converting section 12 via a system bus SB. It is to be noted that the input section 11 may be provided with, for example, an HDMI terminal through which the digital image signal may be input in addition to or in place of the analog image signal. Moreover, an analog or digital audio signal is input into the input section 11. The input section 11 outputs the input audio signal to the audio processing section 22 via the system bus SB.

The image converting section 12 is also called a scaler. The image converting section 12 converts input image data to image data of a predetermined format which is suitable for projection, and transmits the converted data to the projection processing section 13. If necessary, the image converting section 12 transmits the image data on which symbols indicating various operation states for on-screen display (OSD) are superimposed, as processed image data, to the projection processing section 13.

The light source unit 15 emits color light including primary color light of red (R), green (G) and blue (B). The light emitted from the light source unit 15 is totally reflected by the mirror 16 to strike the micromirror device 14. Here, the light source unit 15 is constituted to emit the each color light sequentially in a time sharing manner, or may be constituted to always emit all the color light. The choice of which constitution depends on whether or not a color image is represented by a frame sequential method. Hereinafter, constitutions of the respective sections will be described in accordance with the frame sequential method as an example.

The micromirror device 14 includes micromirrors arranged in an array manner. Each of the micromirrors is operated to turn on and off at a high speed, thereby reflecting the emitted light from the light source unit 15 toward the projection lens unit 17 or away from the direction toward the projection lens unit 17. In the micromirror device 14, the micromirrors are arranged in, for example, a wide extended graphic array (WXGA) (horizontal 1280 pixels×vertical 800 pixels). Because of the reflection by each of the micromirrors, the micromirror device 14 forms, for example, an image of a WXGA resolution. In this way, the micromirror device 14 functions as a spatial light modulating device.

The projection processing section 13 drives the micromirror device 14 in accordance with the image data transmitted from the image converting section 12, to display an image represented by the image data. That is, the projection processing section 13 operates each of the micromirrors of the micromirror device 14 so that the micromirror turns on or off. Here, the projection processing section 13 drives the micromirror device 14 at the high speed in the time sharing manner. The number of divisions of a unit time is obtained by multiplying a frame rate, such as 60 frames/second, in accordance with the predetermined format, the number of divisions of a color component, and a display gradation number. Moreover, the projection processing section 13 also controls an operation of the light source unit 15 synchronously with the operation of the micromirror device 14. That is, the projection processing section 13 divides each frame by the time, and controls the operation of the light source unit 15 to sequentially emit the light of all the color components for each frame.

The projection lens unit 17 regulates the light guided from the micromirror device 14, to project the light on, for example, the unshown screen. Therefore, the light image formed by using the reflected light of the micromirror device 14 is projected and displayed on the screen through the projection lens unit 17.

The audio processing section 22 includes a sound source circuit of a PCM sound source or the like. On the basis of input analog audio data from the input section 11, or on the basis of an analog signal converted from digital audio data obtained at a projecting operation, the audio processing section 22 drives the speaker 23 to amplify and discharge a sound. Moreover, the audio processing section 22 generates a beep sound or the like, if necessary. The speaker 23 is a usual speaker which emits the sound based on the input signal from the audio processing section 22.

The CPU 18 controls operations of the image converting section 12, the projection processing section 13 and the audio processing section 22. The CPU 18 is connected to the main memory 19 and the program memory 20. The main memory 19 is constituted of, for example, an SRAM. The main memory 19 functions as a work memory of the CPU 18. The program memory 20 is constituted of an electrically rewritable nonvolatile memory. The program memory 20 stores an operation program to be executed by the CPU 18, various regular form data and the like. Furthermore, the CPU 18 is connected to the operating section 21. The operating section 21 includes a key operating portion disposed in a main body of the projector 10, and an infrared ray receiving portion which receives an infrared ray from an unshown remote controller for exclusive use in the projector 10. The operating section 21 outputs, to the CPU 18, a key operation signal based on a key operated with the key operating portion of the main body or the remote controller by a user. The CPU 18 controls the operations of the respective sections of the projector 10 in accordance with a user's instruction from the operating section 21 by use of the program and data stored in the main memory 19 and the program memory 20.

Figure 4:
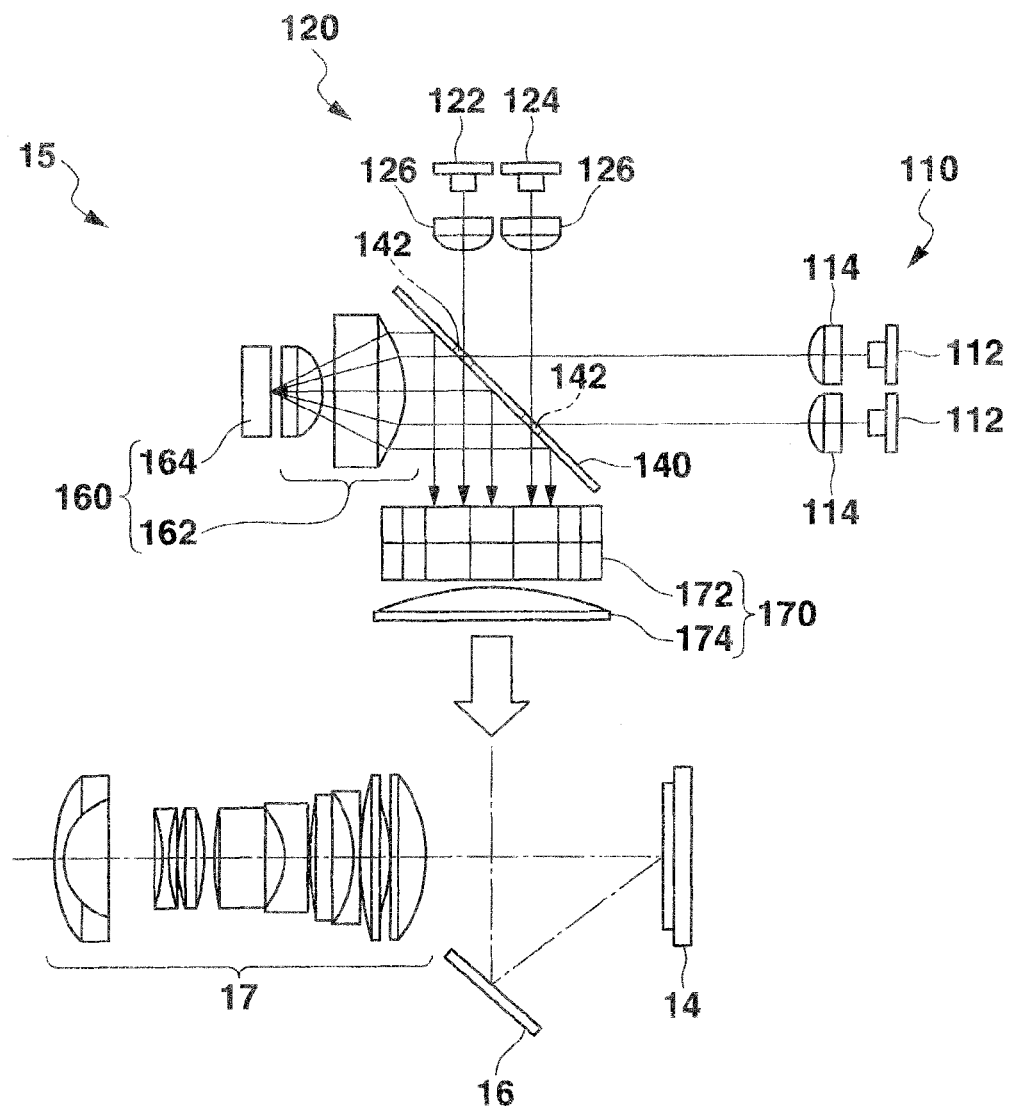
FIG. 4 is a schematic view showing an example of an optical system including a light source device according to the first embodiment of the present invention.

Next, the optical system of the projector 10 according to the present embodiment including the light source unit 15, the mirror 16, the micromirror device 14 and the projection lens unit 17 will be described with reference to FIG. 4.

The light source unit 15 as the light source device according to the first embodiment of the present invention is provided with a first light source 110 which emits blue excitation light, a second light source 120 which emits red. light and blue light, a synthesis member 140, a fluorescent unit 160, and an optical system 170.

The first light source 110 includes one blue semiconductor laser (laser diode; LD) 112 as a semiconductor light emitting element which emits the blue excitation light, or includes the blue LDs. Moreover, the first light source 110 includes first collimator lens(es) 114 corresponding to the (respective) blue LD(s) 112. In the first light source 110 having such a constitution, the blue excitation light (the laser light) from the blue LD(s) 112 is converted to substantially parallel light by the first collimator lens(es) 114, and emitted toward the synthesis member 140.

The second light source 120 includes one red light emitting diode (LED) 122 as a semiconductor light emitting element which emits the red light, or includes the red LEDs 122. Moreover, the second light source 120 includes one blue LED 124 as a semiconductor light emitting element which emits the blue light, or includes the blue LEDs. The red LED(s) 122 and the blue LED(s) 124 are arranged so that optical axes of the diodes have an angle of about 90 degrees with an optical axis of the first light source 110. Furthermore, the second light source 120 includes second collimator lenses 126 which correspond to the red LED(s) 122 and the blue LED(s) 124, respectively.

In the second light source 120 having such a constitution, the red and blue light from the red and blue LEDs 122 and 124 are converted to substantially parallel light by the second collimator lenses 126, and emitted toward the synthesis member 140.

The synthesis member 140 is a reflecting mirror disposed with a tilt of 45 degrees to both of the optical axis of the first light source 110 and the optical axis of the second light source 120. A reflecting surface of the member is disposed on the side of the fluorescent unit 160. However, although specifically described later with reference to FIG. 5A and FIG. 5B, the whole surface of the member on the fluorescent unit 160 side is not a reflecting region, but the member is constituted of at least two transmitting windows 142. The number of the transmitting windows 142 is determined in accordance with the number of the blue LDs 112 of the first light source 110, and the number of the red and blue LEDs 122 and 124 of the second light source 120, and the transmitting windows are arranged at positions corresponding to the optical axes of the blue LDs 112 and the red and blue LEDs 122 and 124. In an example shown in FIG. 4, the number of the blue LDs 112 of the first light source 110 is two, and the number of the red and blue LEDs 122 and 124 of the second light source 120 is two in total including each color LED. Moreover, positional relations among the blue LDs 112 of the first light source 110, the red and blue LEDs 122 and 124 of the second light source 120 and the synthesis member 140 are designed so that at the positions of the transmitting windows 142, the optical axis of one of the blue LDs 112 of the first light source 110 crosses the optical axis of the red LED 122 of the second light source 120 and the optical axis of the other blue LD 112 of the first light source 110 crosses the optical axis of the blue LED 124 of the second light source 120. Therefore, the synthesis member 140 does not have to be provided with four transmitting windows in total, but may only be provided with the two transmitting windows 142. In the synthesis member 140 having such a constitution, the blue excitation light from the blue LDs 112 of the first light source 110 passes through the transmitting windows 142 of the synthesis member 140, and is applied onto the fluorescent unit 160. Moreover, the red and blue light from the red and blue LEDs 122 and 124 of the second light source 120 passes through the transmitting windows 142 of the synthesis member 140, and is guided into the optical system 170.

The fluorescent unit 160 includes a condensing optical system 162 and a fluorescent plate 164. The condensing optical system 162 condenses the incident blue excitation light from the synthesis member 140 on a fluorescent material (not shown) of the fluorescent plate 164. The fluorescent material of the fluorescent plate 164 is excited by the blue excitation light, to emit generated light including a large amount of components of wavelengths of 500 to 600 nm (a green wavelength bandwidth) and having an extensive wavelength distribution. The emitted light is isotropically radiated from the fluorescent material, but is emitted toward the condensing optical system 162 by a reflecting plate (not shown) disposed in the fluorescent plate 164, to travel toward the synthesis member 140 through the condensing optical system 162. Then, the light is reflected by the reflecting surface of the synthesis member 140 (excluding the portions of the transmitting windows 142), and a direction of optical axis of the light is changed so that the optical axis crosses that of the blue excitation light from the first light source 110 at 90 degrees. As a result, the emitted light from the fluorescent unit 160 which includes a large amount of green wavelength component is guided to the optical system 170.

The optical system 170 includes a microlens array 172 and a lens 174. The microlens array 172 has a constitution in which microlenses (not shown) are gathered in a two-dimensional array. The microlens array 172 transforms the light coming through the synthesis member 140 to plane light. The plane light is applied onto the lens 174. The lens 174 guides, to the mirror 16, the plane light through the microlens array 172, i.e., the generated green light including the large amount of green wavelength component of the emitted light from the fluorescent material excited by the blue excitation light of the first light source 110, the red light emitted from the second light source 120, and the blue light emitted from the second light source 120, so that the light is applied onto the micromirror device 14.

The generated green light, the blue light and the red light reflected by the mirror 16 are applied onto the micromirror device 14, respectively. The micromirror device 14 forms a light image by use of the light reflected toward the projection lens unit 17. This light image is projected on an unshown screen of a projection object or the like through the projection lens unit 17.

Next, an operation of the projector 10 according to the present embodiment will be described. Additionally, the following operation is executed by the projection processing section 13 under the control of the CPU 18. The projection processing section 13 controls, for example, emission timings of the blue LDs 112 for the generated green light, the red LED 122 for the red light and the blue LED 124 for the blue light, the operation of the micromirror device 14 and the like.

There will be described an example where three color light of the red light (R), the generated green light (G) and the blue light (B) is allowed to enter the micromirror device 14. At an entrance timing of the red light into the micromirror device 14, the red LED 122 is turned on, and the blue LDs 112 and the blue LED 124 are turned off. At an entrance timing of the generated green light into the micromirror device 14, the blue LDs 112 are turned on, and the red LED 122 and the blue LED 124 are turned off. At an entrance timing of the blue light into the micromirror device 14, the blue LED 124 is turned on, and the blue LDs 112 and the red LED 122 are turned off. In this way, the red light, the generated green light and the blue light sequentially enter the micromirror device 14.

That is, when the red LED 122 is turned on, the red light emitted from the red LED 122 is applied onto the synthesis member 140 through the second collimator lens 126. Since the synthesis member 140 is provided with the transmitting window 142 corresponding to the optical axis of this red light, the red light to be applied is transmitted through the synthesis member 140, and guided to the optical system 170 through which the plane light is obtained. This plane light enters the micromirror device 14 via the mirror 16.

As a luminance of the red light based on the image data becomes higher, the micromirror device 14 lengthens a time to guide the incident light to the projection lens unit 17 every micromirror (every pixel), and as the luminance becomes lower, the device shortens the time to guide the incident light to the projection lens unit 17. That is, the projection processing section 13 controls the micromirror device 14 so that the micromirror corresponding to the high-luminance pixel is in an on-state for a long period of time and so that the micromirror corresponding to the low-luminance pixel is in an off-state for a long period of time. In consequence, as to the emitted light from the projection lens unit 17, the luminance of the red is represented every micromirror (every pixel).

Similarly, when the blue LED 124 is turned on, the blue light emitted from the blue LED 124 is applied onto the synthesis member 140 through the second collimator lens 126. This blue light passes through the corresponding transmitting window 142 of the synthesis member 140, and is transformed to the plane light through the optical system 170. The plane light enters the micromirror device 14 via the mirror 16. A luminance of the blue is represented by the micromirror device 14 every micromirror (every pixel).

When the blue LDs 112 are turned on, the blue excitation light emitted from the blue LDs 112 is applied onto the synthesis member 140 through the first collimator lenses 114. The blue excitation light passes through the corresponding transmitting windows 142 of the synthesis member 140, to enter the fluorescent unit 160. Owing to the incident blue excitation light, the generated light including the large amount of green wavelength component is emitted from the fluorescent unit 160. This generated green light is reflected by the synthesis member 140 to enter the micromirror device 14 via the optical system 170 and the mirror 16. A luminance of the green is represented by the micromirror device 14 every micromirror (every pixel).

For each frame, an image is represented by combining the colors each having the luminance represented at a time when the micromirror is in the on-state. As above, the projection lens unit 17 emits a projecting light indicating the represented image. When this projecting light is projected on, for example, the screen, the image is displayed on the screen or the like.

Figure 5A:
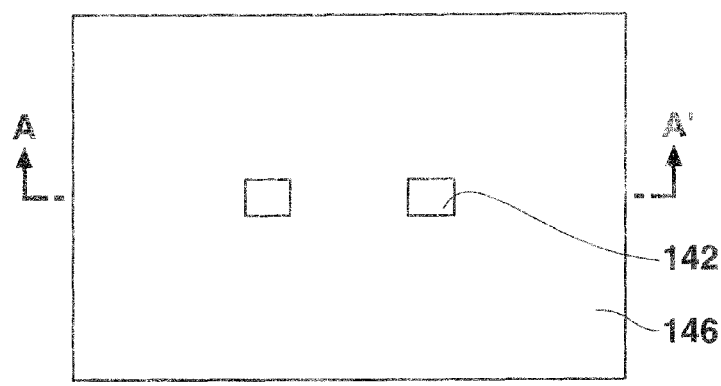
FIG. 5A is a schematic plane view showing a constitution example of a synthesis member in the light source device according to the first embodiment.
Figure 5B:
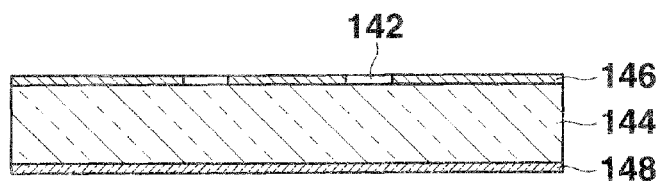
FIG. 5B is a cross-sectional view obtained by taking along line A-A' in FIG. 5A.

Next, a specific constitution of the synthesis member 140 will be described with reference to FIG. 5A and FIG. 5B. Additionally, FIG. 5A is a plan view of the synthesis member 140 seen from the fluorescent unit 160 side, and FIG. 5B is a cross-sectional view obtained by taking along line A-A' in FIG. 5A.

On the surface of a glass substrate 144 of the synthesis member 140 on the side of the fluorescent unit 160 (the side of an entrance surface of the generated green light), a visible light reflecting film 146 is formed which reflects a visible light of about 400 to 700 nm. Further in the visible light reflecting film 146, the transmitting windows 142 to transmit the visible light are disposed at two positions of a region to transmit the blue excitation light and the red light, and a region to transmit the blue excitation light and the blue light, when the two blue LDs 112, the one red LED 122 and the one blue LED 124 are disposed as shown in FIG. 4. The transmitting windows 142 may have any size and shape, but the windows preferably have such size and shape that the blue excitation light from the blue LDs 112, the red light from the red LED 122 and the blue light from the blue LED 124 are not interrupted as much as possible.

Moreover, on the surface of the glass substrate 144 of the synthesis member 140 on the side of the first and second light sources 110 and 120 (the side of an entrance surface of the blue excitation light, the red light and the blue light), a reflection preventing film 148 is formed to prevent the blue excitation light, the red light and the blue light from being reflected, when the light enters the glass substrate 144. Owing to the reflection preventing film 148, almost all of the blue excitation light, the red light and the blue light, which have reached the synthesis member 140, enter the glass substrate 144, and hence loss of light quantity due to the reflection can be prevented.

According to the present embodiment, the light source unit 15 which is the light source device includes the first light source 110 which emits the blue excitation light; the fluorescent unit 160 having the fluorescent material which receives the excitation light from the first light source 110 to generate the light of the green wavelength bandwidth; the red LED 122 of the second light source 120 which emits the red light; and the synthesis member 140 including the visible light reflecting film 146 which reflects the visible light, and the transmitting window 142 which is disposed in the visible light reflecting film 146 to transmit the visible light. The red LED 122 of the second light source 120, the fluorescent material and the synthesis member 140 are mutually arranged in such positional relations that the transmitting window 142 of the synthesis member 140 is positioned along the optical axis of the red light emitted from the red LED 122 of the second light source 120 and that the emitted light from the fluorescent material is reflected in the optical axis direction of the red light emitted from the red LED 122 of the second light source 120 by the visible light reflecting film. 146 of the synthesis member 140.

According to the light source unit 15 having such a constitution, most of the emitted light from the fluorescent material is reflected by the visible light reflecting film 146, and the emitted light from the fluorescent material only in the portion of the transmitting window 142 is transmitted. Therefore, the emitted light from the fluorescent material can effectively be utilized without losing most of the emitted light. That is, the emitted light from the fluorescent material includes the large amount of green wavelength component, but has an extensive wavelength distribution. When such an emitted light is reflected by a dichroic film which transmits the red light and reflects the green light, a portion of the wavelength bandwidth is not synthesized to cause a loss. On the contrary, in the light source unit 15 as the light source device according to the present embodiment, the emitted light from the fluorescent. material can effectively be utilized without losing most of the emitted light, and a bright light can be obtained. In consequence, the projector 10 according to the present embodiment including such a light source device of the present embodiment can brightly project the image.

Moreover, in the present embodiment, the first light source 110, the fluorescent material and the synthesis member 140 are mutually arranged in such positional relations that the excitation light emitted from the first light source 110 passes through the transmitting window 142 of the synthesis member 140, and is applied onto the fluorescent material. In this case, a portion to transmit the excitation light from the first light source 110 and a portion to transmit the red light can be the same transmitting window, and hence the number of the transmitting windows 142 can be decreased. Needless to say, the transmitting windows 142 may be provided as separate transmitting portions, but needless to say, for decreasing, as much as possible, the emitted light from the fluorescent material which is transmitted without being reflected, the number of the transmitting windows 142 is preferably as small as possible.

Furthermore, in the present embodiment, the synthesis member 140 further includes the glass substrate 144 provided with the visible light reflecting film 146 including the transmitting windows 142, and the reflection preventing film 148 formed on the surface of the glass substrate 144 opposite to the surface of the glass substrate on which the visible light reflecting film 146 is formed. Owing to the reflection preventing film 148, almost all of the blue excitation light, the red light and the blue light, which have reached the synthesis member 140, enter the glass substrate 144, and hence the loss of light quantity due to the reflection can be prevented.

Additionally, in the present embodiment, the second light source 120 has the blue LED 124 which further emits the blue light. In consequence, the blue light can be guided to the optical system 170 through the transmitting window 142 of the synthesis member 140.

[Second Embodiment]

Next, a second embodiment of the present invention will be described. A projector according to the second embodiment is similar to the first embodiment, except a constitution of a synthesis member 140 of a light source unit 15. Therefore, description of a similar part is omitted, and an only different part will be described.

Figure 6A:
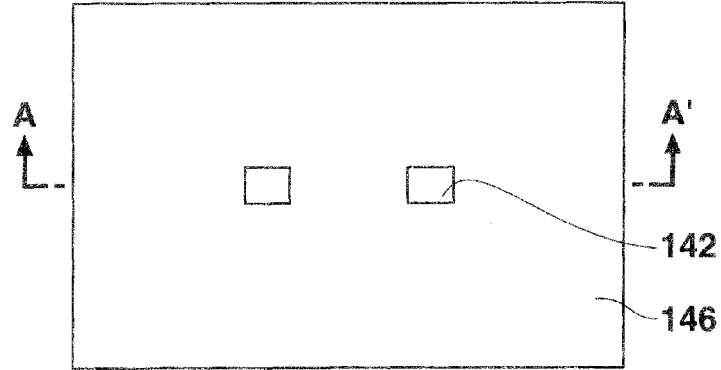
FIG. 6A is a schematic plane view showing a constitution example of a synthesis member in a light source device according to a second embodiment of the present invention.
Figure 6B:
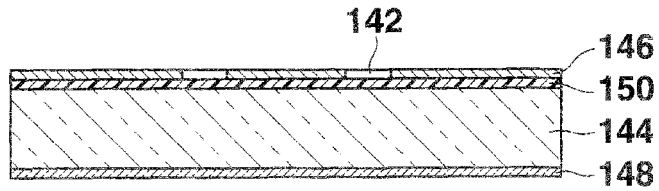
FIG. 6B is a cross-sectional view obtained. by taking along line A-A' in FIG. 6A.

The light source unit 15 as a light source device according to the second embodiment includes the synthesis member 140 having a constitution shown in FIG. 6A and FIG. 6B. Additionally, FIG. 6A is a plan view of the synthesis member 140 seen from a fluorescent unit 160 side, and FIG. 6B is a cross-sectional view obtained by taking along line A-A' in FIG. 6A.

In the synthesis member 140 of the second embodiment, between the visible light reflecting film 146 which reflects the visible light of about 400 nm to about 700 nm and the glass substrate 144 described above in the first embodiment, a dichroic film 150 is formed which transmits a red light and a blue light and reflects a green light. Moreover, the visible light reflecting film 146 is provided with transmitting windows 142 each having arbitrary size and shape, similarly to the first embodiment.

Additionally, the dichroic film 150 is formed on the whole surface of the glass substrate 144, and further on the film, the visible light reflecting film 146 is formed. This manufacturing step is simple, and the films can inexpensively be formed. However, it is not necessary to form the dichroic film 150 on the whole surface of the glass substrate 144, and the film may be formed only on portions corresponding to at least the transmitting windows 142.

According to the second embodiment using the synthesis member 140 having such a constitution, an effect similar to that of the first embodiment is produced. Moreover, the synthesis member 140 corresponds to at least the transmitting windows 142, and is provided with the dichroic film 150 which transmits the red light and the blue light and reflects the green light. Therefore, when light including a large amount of green wavelength component but having an extensive wavelength distribution is emitted from the fluorescent unit 160 to enter the transmitting windows 142, the green wavelength component of the emitted light can be reflected by the dichroic film 150, and guided to an optical system 170. Consequently, loss of emitted light through the transmitting windows 142 can be decreased as compared with the first embodiment, and accordingly, it is possible to more effectively utilize the emitted light from the fluorescent material and to obtain a brighter light than in the first embodiment. In consequence, a projector 10 according to the second embodiment including the light source device of the second embodiment can further brightly project an image.

Additionally, in the first and second embodiments, to generate the emitted light from the fluorescent material which includes the large amount of green wavelength component, a blue component light is used in the excitation light. However, needless to say, another color light such as an ultraviolet light may be used.

Moreover, in the fluorescent unit 160, the fixed fluorescent plate 164 is used, but a fluorescent wheel may be used as disclosed in Jpn. Pat. Appln. KOKAI Publication No. 2011-13320 so that the excitation light does not continuously strike one portion.

Furthermore, needless to say, the synthesis member 140 described in the first or second embodiment can be applied to a first optical axis converting mirror 151a or the like which is the dichroic mirror of Jpn. Pat. Appln. KOKAI Publication No. 2011-13320, and the synthesis member is not limited to the constitution of the light source unit 15 described in the present embodiments.

That is, the present invention is not limited to the above embodiments as it is, and an implementing stage of the invention, constituent elements can be modified and embodied without departing from the scope of the invention. Moreover, various inventions can be formed by suitably combining the constituent elements described in the embodiments. For example, even when several constituent elements are omitted from all the constituent elements of the embodiments, a constitution from which the constituent elements have been omitted can be extracted as the invention, as long as the problems described in the paragraphs of the problems to be solved by the invention can be solved and the effect of the invention can be obtained.

What is claimed is:

1. A light source device comprising:
   a first light source which emits excitation light of a first wavelength bandwidth;
   a fluorescent material which receives the excitation light from the first light source to generate light of a second wavelength bandwidth which is different from the first wavelength bandwidth;

a second light source which emits light of a wavelength bandwidth which is different from the second wavelength bandwidth; and a synthesis member including a visible light reflecting film which reflects visible light, and a transmitting window which is disposed within an area of the visible light reflecting film to transmit the visible light, wherein the transmitting window comprises an area of the synthesis member which is surrounded by the visible light reflecting film and where the visible light reflecting film is not provided, and wherein a total surface area of the transmitting window is smaller than a total surface area of the visible light reflecting film, wherein the second light source, the fluorescent material and the synthesis member are mutually arranged in positional relations such that the transmitting window of the synthesis member is positioned along an optical axis of the light emitted from the second light source, the visible light reflecting film of the synthesis member is positioned along an optical axis of the generated light emitted from the fluorescent material, and the generated light emitted from the fluorescent material is reflected in an optical axis direction of the light emitted from the second light source by the visible light reflecting film of the synthesis member.

2. The light source device according to claim 1, wherein the first light source, the fluorescent material and the synthesis member are mutually arranged in such positional relations that the excitation light passes through the transmitting window of the synthesis member, and is applied onto the fluorescent material.

3. The light source device according to claim 1, the synthesis member is provided, at a position corresponding to at least the transmitting window, with a dichroic film which transmits the excitation light and the light from the second light source and which reflects the light of the second wavelength bandwidth.

4. The light source device according to claim 1, wherein the synthesis member includes:

a glass substrate on which the visible light reflecting film provided with the transmitting window is formed; and a reflection preventing film formed on the surface of the glass substrate opposite to the surface of the glass substrate on which the visible light reflecting film is formed.

5. The light source device according to claim 1, wherein the second light source comprises a light source to emit the light of a wavelength bandwidth which is longer than the second wavelength bandwidth, and a light source to emit the light of a wavelength bandwidth which is shorter than the second wavelength bandwidth.

6. A projector comprising: a light source device according to claim 1;

a display device;

a light source side optical system which guides the light from the light source device to the display device;

a projecting side optical system which projects an image emitted from the display device; and a projector control section which controls the light source device and the display device.

7. The light source device according to claim 1, wherein the transmitting window is arranged at a position where an optical axis of the light emitted from the first light source intersects with the optical axis of the light emitted from the second light source.

* * * * *